United States Patent [19]

Lasley et al.

[11] Patent Number: 5,759,615

[45] Date of Patent: Jun. 2, 1998

[54] METHOD FOR MEASURING POWDER COATING THICKNESS PRIOR TO CURING

[75] Inventors: Charles T. Lasley, Toledo; Behrouz N. Shabestari, Sylvania, both of Ohio

[73] Assignee: Edison Industrial Systems Center, Toledo, Ohio

[21] Appl. No.: 920,166

[22] Filed: Aug. 27, 1997

[51] Int. Cl.⁶ .................................................. B05D 5/12

[52] U.S. Cl. .............................. 427/9; 427/10; 427/180; 427/421; 427/475

[58] Field of Search ........................... 427/9, 10, 180, 427/421, 475

Primary Examiner—Bernard Pianalto
Attorney, Agent, or Firm—Donald R. Fraser

[57] ABSTRACT

A process for measuring the thickness of a layer of powder upon the surface of a workpiece comprises depositing a layer of powder on the surface of the workpiece and simultaneously on the surface of an adjacent wire, directing the powder coated wire past a sensor capable of measuring the diameter of the powder coated wire, and comparing the diameter of the powder coated wire to the diameter of the uncoated wire.

13 Claims, No Drawings

METHOD FOR MEASURING POWDER COATING THICKNESS PRIOR TO CURING

FIELD OF THE INVENTION

This invention relates to a method for measuring the thickness of a powder coating prior to curing the powder. More particularly, the invention is directed to a process for applying a powder coating to a workpiece, and simultaneously applying the powder to the surface of an adjacent wire upon which the thickness of the powder coating can be easily ascertained, in order to determine the thickness of the powder coating on the workpiece.

BACKGROUND OF THE INVENTION

Powder coating involves the application of a finely divided coating powder to a surface, followed by a melting or curing of the coating solids to form a continuous film. For spray powder coating, very little, if any, solvent is used, and the process is essentially pollution-free. For electrostatic powder coating, charged powder particles are electrostatically attracted to the surface of the workpiece to form a layer of powder. Spray and electrostatic powder coating processes are well-known in the art.

A typical powder size for powder coatings is generally greater than about 15 micrometers. Since 1 mil is about 25 micrometers, it is clear that uniform spray powder coatings are difficult to achieve at thicknesses in the range from about 2 to about 10 mils. Fluidized bed powder coatings are generally about 200 micrometers in diameter, and thus are not desirable for applying thin powder coatings.

A significant problem in the powder coating industry is determining the thickness of the powder layer upon the workpiece before the powder is cured to form a monolithic powder coating layer thereon. Conventional methods for measuring the powder thickness involve mechanically contacting the applied powder layer and/or workpiece, to electronically or mechanically measure the thickness of the uncured powder layer.

It would be desirable to develop a process for measuring a powder coating thickness prior to its cure, which method would not disturb the powder layer as applied to the workpiece, nor the workpiece itself.

SUMMARY OF THE INVENTION

Accordant with the present invention, a non-invasive method for measuring the thickness of a powder layer as applied to a workpiece, prior to the curing of the powder to form a monolithic powder coating, has surprisingly been discovered. The process comprises the steps of depositing a layer of powder on the surface of a workpiece and simultaneously on the surface of an adjacent wire, directing the powder coated wire past a sensor capable of measuring the diameter of the powder coated wire, and comparing the diameter of the powder coated wire to the diameter of the uncoated wire.

The process for measuring the thickness of a powder coating according to the present invention is particularly well-suited for measuring powder paint and powder anti-corrosion layers prior to their cure to form monolithic paint and anti-corrosion layers, respectively, on metal or plastic surfaces.

DETAILED DESCRIPTION OF THE PREFERRED EMBODIMENT

This invention is directed to a process for measuring the thickness of a layer of powder upon a workpiece. The process comprises the steps of depositing a layer of powder on the surface of a workpiece and simultaneously on the surface of an adjacent wire, directing the powder coated wire past a sensor capable of measuring the diameter of the powder coated wire, and comparing the diameter of the powder coated wire to the diameter of the uncoated wire.

Suitable powders for use according to the present invention include, but are not necessarily limited to, particles of paint, phenolic resin, alkyd resin, urea-formaldehyde resin, rubber, vinyl polymer, polyurethane resin, silicone resin, latex, epoxy resin, styrenic resin, and the like, as well as blends and copolymers thereof. Generally, the particles range in size from about 15 micrometers to about 250 micrometers. These powders may be sprayed from conventional powder spray or electrostatic spray devices which are well-known in the art.

The powder is sprayed onto the surface of a workpiece that is to receive a monolithic coating of the sprayed, cured material. The powder may simply be mechanically sprayed onto the surface of the workpiece, or the spraying process may be assisted by causing the powder to be electrostatically attracted to the surface of the workpiece. As will be readily apparent to those ordinarily skilled in the art, other conventional methods may also be used to deposit the powder onto the surface of the workpiece, such as for example by sprinkling, dipping, or fluid bed coating.

As the powder is deposited onto the surface of the workpiece, it is simultaneously deposited onto the surface of an adjacent wire. Conventional wire materials may be used including, by way of example but not limitation, metal, plastic and polymer filaments, textile fibers, and the like, as well as combinations thereof. The wire is positioned at a distance from about one-half inch to about 6 inches from the surface of the workpiece. Preferably, the wire is located about 2 inches from the surface of the workpiece. The wire may be stationary with respect to the workpiece, or may be moving relative to the workpiece. For example, if the workpiece is being conveyed through the powder coating station, the wire may be passed axially at the same speed through the same powder coating station at a fixed position relative to the workpiece. Alternatively, the workpiece may remain stationary at the powder coating station while the wire is conveyed axially but at a radially fixed position relative to the surface of the workpiece. One ordinarily skilled in the art will readily recognize that other configurations may be employed.

Most importantly, depending upon the speed of the surface of the workpiece through the powder coating station relative to the speed of the surface of the wire through the coating station, there exits a relationship between the thickness of the powder coating on the surface of the wire and the thickness of the powder coating upon the surface of the workpiece. Thus, by measuring the thickness of the powder coating on the surface of the wire, the thickness of the powder coating on the surface of the workpiece may be determined. Accordingly, the inventive process provides a method for measuring the thickness of a powder coating on the surface of a workpiece without contacting or disturbing either the powder coating or the workpiece.

Following the deposition of the powder on the surfaces of the workpiece and wire, the wire is directed past a sensor capable of measuring the diameter of the powder coated wire. This diameter will, of course, be greater than the diameter of the previously uncoated wire, due to the powder particles adhered to the surface thereof. Conventional methods for directing or conveying the powder coated wire past a sensor are well-known and included, for example, the use of an electric motor and series of pulleys whereby wire may be continuously payed-out from a spool and directed axially adjacent the surface of the workpiece thence past a sensor.

Sensors useful for measuring the diameter of the powder coated wire are well-known in the art. A preferred sensor is a VG series sensor available from Keyence. The sensor may be coupled to a computer or other appropriate device capable of comparing the diameter of the powder coated wire to the diameter of the uncoated wire and thereby calculating the thickness of the powder coating on the surface of the workpiece.

The powder layer may ultimately be cured by conventional means well-known in the art such as, for example, by heating the workpiece having the layer of powder thereon.

EXAMPLE

A wire is continuously conveyed in the same direction of travel and at the same speed as a workpiece through a powder coating station. The wire maintains a position approximately 2 inches away from the surface of the workpiece. The workpiece and adjacent wire are electrostatically sprayed with a polymeric powder. The powder coated wire is thereafter directed past a Keyence VG series sensor, including a well-columnated long area class II laser light source, a 5,000 pixel CCD image sensor, and an associated controller/interface head. An average of several coated wire diameter measurements is calculated as the coated wire passes through the sensor station. The coated wire passes by the sensor at about 10 feet per minute. The sensor has a measurement frequency of about 780 scans per second, resulting in one diameter measurement about each 0.065 millimeters. It is observed that the actual average diameter of the coated wire varies by only about 0.002 millimeters over the length of the coated wire that is measured. The measured diameter is compared to the diameter of the uncoated wire and an associated computer calculates that the thickness of the powder coating on the workpiece is about 100 micrometers.

It must be noted that the process conditions are not sharply critical for the successful measurement of the thickness of a layer of powder, according to the present invention. The process conditions described hereinabove are generally disclosed in terms which are conventional in the art to the practice of this invention. Occasionally, however, the process conditions as described may not be precisely applicable for each powder, wire, and workpiece included within the disclosed scope. Those instances where this occurs will be readily recognizable to those ordinarily skilled in the art. In all such cases, either the process may be successfully performed by conventional modifications known to those ordinarily skilled in the art; e.g., by increasing or decreasing the rate of relative movement between the wire an the workpiece, by using other routine methods for depositing the powder on the surface of the workpiece, etc., or other process conditions which are otherwise conventional will be applicable to the practice of the present invention.

The invention is more easily comprehended by reference to specific embodiments which are set forth herein as representative of the invention. It must be understood, however, that the specific embodiments are provided only for the purpose of illustration, and that the invention may be practiced otherwise than as specifically described without departing from its spirit and scope.

What is claimed is:

1. A process for measuring the thickness of a layer of powder upon the surface of a workpiece, comprising the steps of:

depositing a layer of powder on the surface of a workpiece and simultaneously on the surface of an adjacent wire;

directing the powder coated wire past a sensor capable of measuring the diameter of the powder coated wire; and comparing the diameter of the powder coated wire to the diameter of the uncoated wire.

2. The process for measuring the thickness of a layer of powder upon the surface of a workpiece according to claim 1, wherein the powder comprises particles of paint, phenolic resin, alkyd resin, urea-formaldehyde resin, rubber, vinyl polymer, polyurethane resin, silicone resin, latex, epoxy resin, styrenic resin, or blends or copolymers thereof.

3. The process for measuring the thickness of a layer of powder upon the surface of a workpiece according to claim 1, wherein the powder is deposited on the surface of the workpiece by mechanical spraying.

4. The process for measuring the thickness of a layer of powder upon the surface of a workpiece according to claim 1, wherein the powder is deposited on the surface of the workpiece by electrostatic spraying.

5. The process for measuring the thickness of a layer of powder upon the surface of a workpiece according to claim 1, wherein the wire comprises a metal, plastic, or polymer filament, textile fiber, or combinations thereof.

6. The process for measuring the thickness of a layer of powder upon the surface of a workpiece according to claim 1, wherein the wire is positioned adjacent the surface of the workpiece at a distance from about one-half inch to about 6 inches from the surface of the workpiece.

7. The process for measuring the thickness of a layer of powder upon the surface of a workpiece according to claim 6, wherein the wire is positioned about 2 inches from the surface of the workpiece.

8. The process for measuring the thickness of a layer of powder upon the surface of a workpiece according to claim 1, wherein the wire remains stationary relative to the workpiece as the powder is deposited on the surfaces of the workpiece and the wire.

9. The process for measuring the thickness of a layer of powder upon the surface of a workpiece according to claim 1, wherein the wire moves relative to the workpiece as the powder is deposited on the surfaces of the workpiece and the wire.

10. The process for measuring the thickness of a layer of powder upon the surface of a workpiece according to claim 9, wherein the wire moves in an axial direction.

11. The process for measuring the thickness of a layer of powder upon the surface of a workpiece according to claim 1, wherein the diameter of the powder coated wire and the diameter of the uncoated wire are compared utilizing a computer.

12. A process for measuring the thickness of a layer of powder upon the surface of a workpiece, comprising the steps of:

depositing, by electrostatic spraying, a layer of powder comprising particles of paint, phenolic resin, alkyd resin, urea-formaldehyde resin, rubber, vinyl polymer, polyurethane resin, silicone resin, latex, epoxy resin, styrenic resin, or blends or copolymers thereof onto the surface of a workpiece and simultaneously on the surface of an adjacent wire comprising metal, plastic, or polymer filaments, textile fibers, or combinations thereof, said wire being positioned at a distance from about one-half inch to about 6 inches from the surface of the workpiece, said wire being stationary relative to the workpiece as the powder is deposited on the surfaces of the workpiece and the wire;

directing the powder coated wire past a sensor capable of measuring the diameter of the powder coated wire; and comparing the diameter of the powder coated wire to the diameter of the uncoated wire.

13. The process of measuring the thickness of a layer of powder upon the surface of a workpiece according to claim 12, wherein the wire is positioned at a distance of about 2 inches from the surface of the workpiece.

* * * * *